June 22, 1965 E. EISENBERG ET AL 3,190,707

CARD INDEX FILE

Filed June 28, 1963

2 Sheets-Sheet 1

INVENTORS
EDWARD EISENBERG
ROMAN A. SICHO
BY Albert F Kronman
ATTORNEY

CARD INDEX FILE

Filed June 28, 1963 2 Sheets-Sheet 2

INVENTORS
EDWARD EISENBERG
ROMAN A. SICHO
BY Albert F. Kronman
ATTORNEY

United States Patent Office 3,190,707
Patented June 22, 1965

3,190,707

CARD INDEX FILE

Edward Eisenberg, Roosevelt, and Roman A. Sicho, Poestenkill, N.Y., assignors to Rockaway Metal Products, Corp., Inwood, N.Y., a corporation of New York Filed June 28, 1963, Ser. No. 291,576
7 Claims. (Cl. 312—184)

This invention relates to a card filing device and particularly to a device capable of retaining a plurality of cards for ready reference.

Where a plurality of cards are to be retained within a single file it has been known to secure the cards upon a rotating barrel and provide for access thereto by turning the said barrel until the desired card is reached. However, such devices often render the cards therein difficult to read, particularly when loaded to capacity. In addition, a large amount of the card surface is taken up by the card holding device.

Withdrawing a card from presently known devices is a difficult operation, often resulting in card damage.

Accordingly, it is an object of the present invention to provide a card filing device in which a large number of cards can be carried and exposed for ready reference.

Another object of the present invention is to provide a card filing device in which each card will be raised for view as it is turned past a viewing station.

Another object of the present invention is to provide a card viewing and filing device in which a maximum amount of the card surface will be available for information.

Still another object of the present invention is to provide a campact card filing device which may be operated manually or by power.

A feature of the present invention is its use of a driving wheel and convoluted belt for positively engaging individual cards and bringing them into ready reference position.

Another feature of the present invention is its provision of a viewing station for cards as they are rotated through the device.

Still another feature of the present invention is its use of, magnetic means for the cards whereby they are held at the top thereof, and raised for inspection.

A further feature of the present invention is its spring loaded baffle structure whereby the cards are urged in the direction of the card conveying mechanism.

The invention consists of the construction, combination and arrangement of parts, described and claimed.

In the accompanying drawings forming part hereof is illustrated two forms of embodiment of the invention in which drawings similar reference characters designate corresponding parts and in which.

Figures 1, 2, 3:
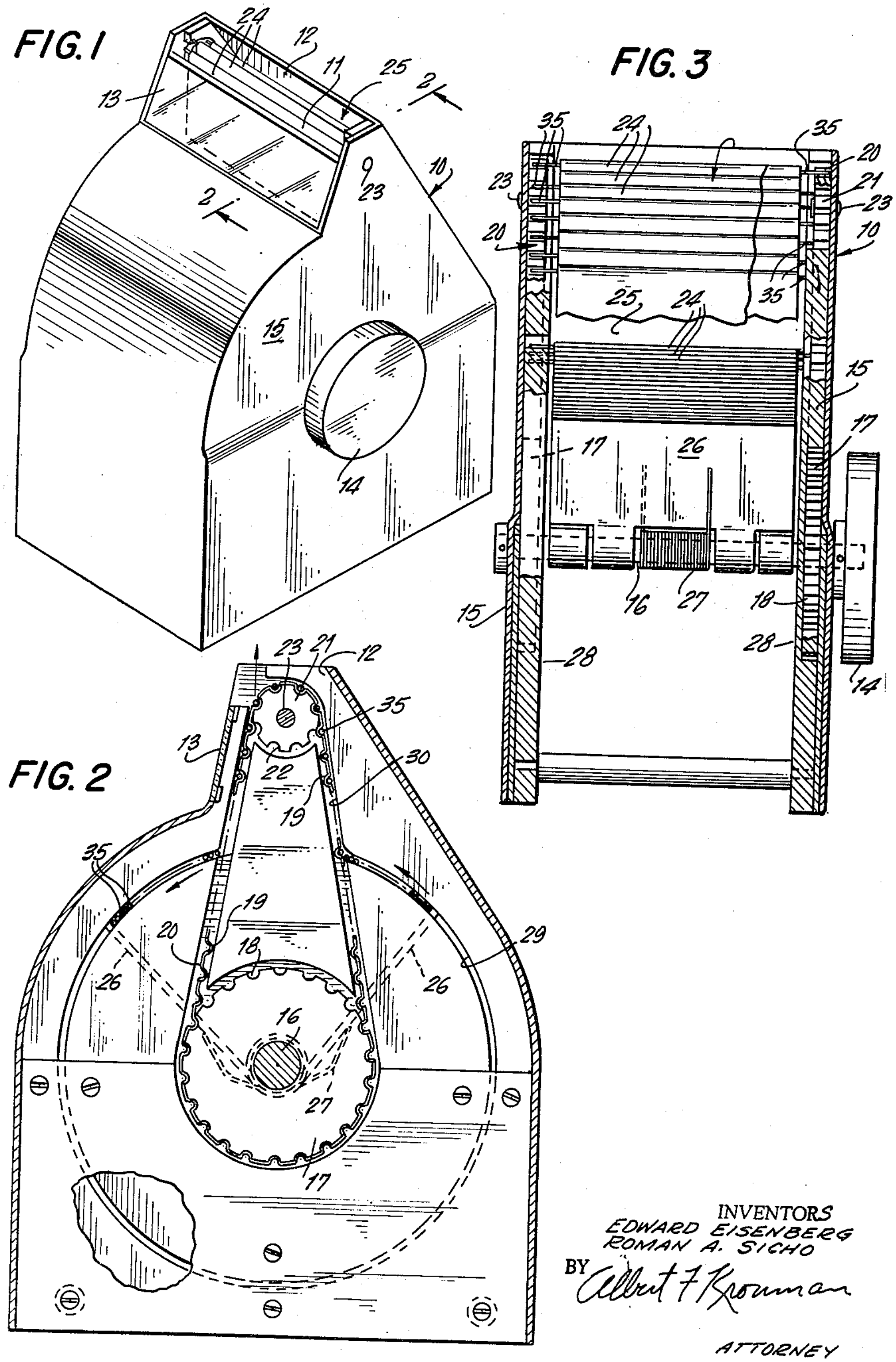
FIGURE 1 is a perspective view of a card file made in accordance with the present invention.
FIGURE 2 is a view in vertical section taken on line 2—2 of FIGURE 1, looking in the direction of the arrows.
FIGURE 3 is a view in front elevation of the card filing device shown in FIGURE 1, with certain parts broken away to show the internal construction.

Referring to the drawings and particularly to FIGURES 1, 2 and 3, 10 indicates a case or housing within which there is carried a plurality of file cards 11, or the like. The case is provided with an opening 12 at the top thereof through which individual cards 11 can be inserted or removed.

A window 13 is provided on the front of the case 10, through which individual cards may be observed. The window may be made of glass, plastic or some other suitable transparent material as desired.

The card filing device is provided with an operating knob 14 which is located adjacent one of the side walls 15 of the case or housing 10. The knob 14 is secured to the end of a shaft 16, (best shown in FIGURES 2 and 3) which shaft is journaled in each of the opposed side walls 15, of the case 10. The shaft 16 is horizontally disposed and traverses the said case 10.

Driving wheels 17 are carried within the case 10 and are secured to the shaft 16 adjacent the inside of each side wall 15. The driving wheels 17 are provided with a series of transverse grooves 18, in the face thereof, which grooves are adapted to engage the convolutions 19 in a continuous belt 20. The belt 20 is made of some suitable spring-like material, such as spring steel, plastic, or the like. The driving wheels 17 support the belts 20 at their lower ends, and a small driven wheel 21, supports each of the belts at the top of the card filing device. The driven wheels 21 are provided with transverse grooves 22 to receive therein the convolutions 19 of the belts 20. A small shaft 23, traverses the top of the case 10 and is supported in each of the side walls 15. The shaft 23 holds the wheels 21 which are freely rotatable thereon. It will be seen that as the knob 14 is turned, the belts 20 will be driven by the driving wheels 17 much in the manner of a chain and sprocket drive.

The index cards or file cards 11, are stored in a chamber 25, within the case 10. The chamber 25 is defined by the housing side walls and two supporting flaps 26. The flaps 26 are carried upon the shaft 16 in the somewhat hinge-like arrangement shown in FIGURE 3. The flaps 26 are also spring loaded by the coil spring 27 so that the cards 24 supported thereby are urged in the direction of the belt 20.

The inner face 28 of each of the side walls 15 is provided with a substantially annular groove 29. The groove 29 communicates at its upper end with a somewhat frusto-conical groove 30 cut into the inside surface 28 of the side walls. The groove 30 generally follows the path of the belt 20 as it passes over the surface of wheels 21.

Figures 4, 5, 6, 7, 8:
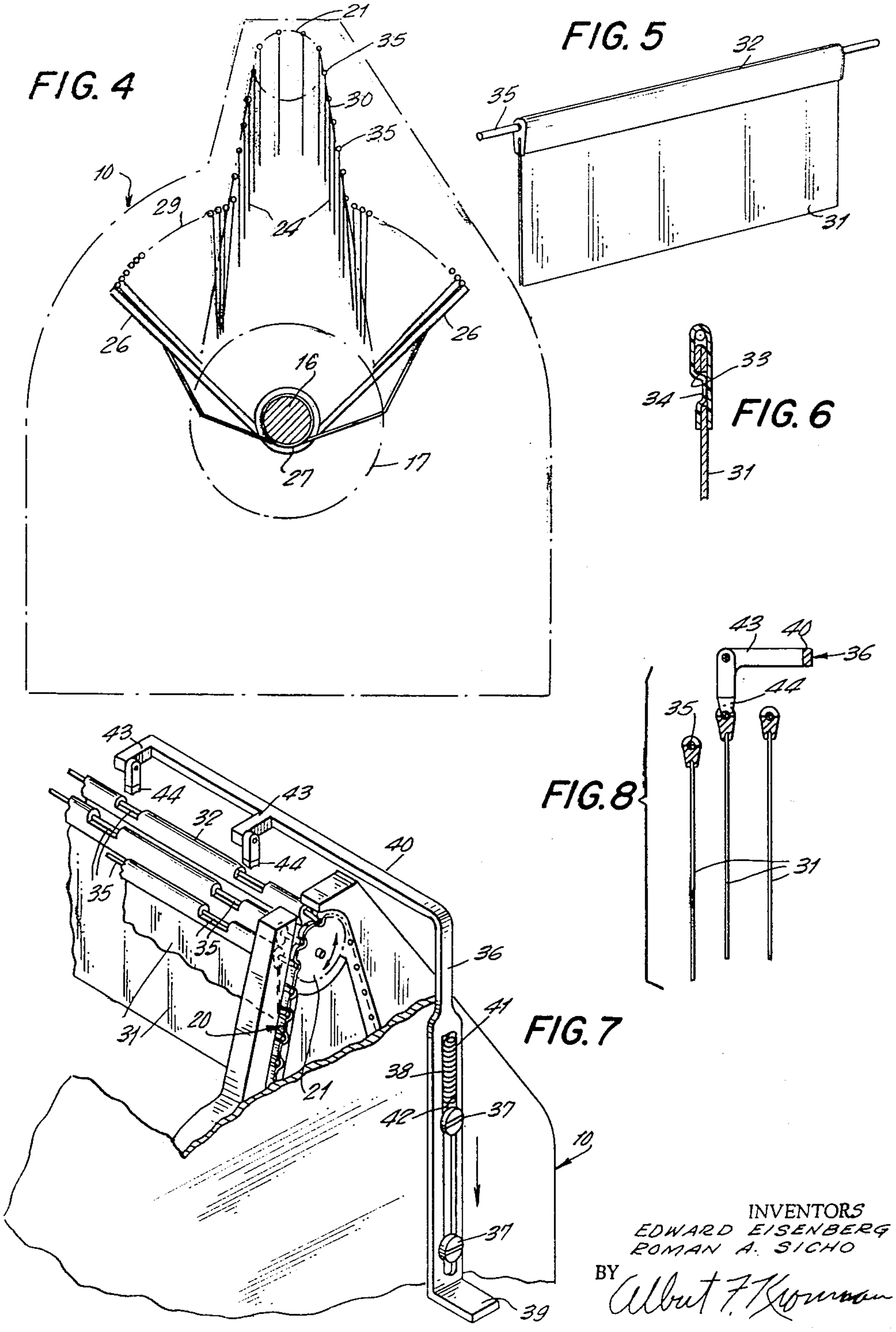
FIGURE 4 is a somewhat diagrammatic view of the card filing device showing the manner in which cards are carried by the card advancing mechanism.
FIGURE 5 is a view in perspective of a card and holder therefor, on a somewhat enlarged scale.
FIGURE 6 is a view in cross section showing another form of card holding means.
FIGURE 7 is a fragmentary view of a card file showing a card elevating mechanism, a second embodiment of the invention.
FIGURE 8 is a fragmentary view somewhat enlarged of a portion of the card elevating mechanism shown in FIGURE 7.

As shown in FIGURES 5 and 6, the card members 31 are held at their tops by a small clip or tab 32. In the embodiment shown in FIGURE 5, the clip 32 slips over or is cemented to the card 31. In the embodiment shown in FIGURE 6, the card 31 is provided with one or more openings 33, and the clip 32 offset or crimped as indicated at 34 to engage the openings 33.

The clips 32 embrace outwardly extending pins 35. When the cards 31 are within the case 10, the pins 35 are held within the grooves 29–30. The card next adjacent the belt 20 is urged against the belt by the flap members 26. As the knob 14 is rotated either clockwise or counter-clockwise, the pins 35 adjacent the belt portion moving upwardly will be engaged by convolutions 19 in the belts 20 and carried upwardly. The pins 35 in the belt convolutions 19 which are moving down will come out of the convolutions as they reach the annular groove 29 and the card will move into the compartment 25. In this manner, the cards can be run through the case 10 from both sides of the chamber for ready reference. It will be observed that as the cards climb the grooves 30 under the motion imparted by the belts 20, they will become separated as shown in FIGURES 4 and 7. This separation will be sufficient to enable a person to look at the tops of the cards so that the proper one may be selected.

The cards may be raised and removed from the holder through an opening 12 either manually or by the apparatus illustrated in FIGURES 7 and 8. This apparatus consists of a bracket 36 slidably secured to the side wall 15 of the case 10 by screws 37. The bracket 36 is provided with an elongated arm 40, which extends across the top of the case 10 behind the opening 12. The bracket 36 is maintained in a raised position by means of the coil spring 41 which is disposed within the elongated slot 38 between a stop member 42, and the top of the said slot. The arm 40 is provided with outwardly extending portions 43, to which are attached small permanent magnets 44. When it is desired to raise a card 31 from the case 10 it is merely necessary to depress the bracket 36 by pushing the finger part 39 down against the tension of the spring 41. The magnets 44 are then brought to bear against the top of the clip 32 which may be made of some ferrous material. If the clips 32 are made of non-ferrous material, they may be cut away as shown in FIGURE 8 to enable the magnets to engage the pins 35. When the finger part 39 is released the spring 41 will raise the arm 40 together with the card which will be held by the magnets 44. The card may then be examined or grasped by the operator and removed from the file through the opening 12. In the normal operating position, the magnets 44 are held sufficiently high above the cards 31 so that there is no interference with their passage through the groove 30 in the top of the device.

It will be seen that a large number of cards can be held between the flaps 26 and that these cards may be inspected rapidly by turning the knob 14. It will also be understood that a motor may be attached to the shaft 16 by a suitable pulley (not shown) for mechanical rotation of the shaft.

From the foregoing it will be seen that there has been provided a card filing device which will positively control the passage of cards therethrough so that the said cards may be inspected, referred to or withdrawn for ready use.

Having thus fully described the invention, what is claimed as new and desired to be secured by Letters Patent of the United States is:

1. A card filing device comprising a case, opposed side walls, a front and a rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a substantially annular groove in each of the side walls around the first shaft, a frusto-conical groove in each of the side walls at the top thereof, said frusto-conical grooves communicating at the bottom thereof with the annular grooves, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, and means to rotate the first shaft and drive the belts to individually raise and lower the cards within the case.

2. A card filing device comprising a case, opposed side walls, a front and a rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a plurality of transverse grooves in the face of each of the drive and driven wheels to receive the belt corrugations, a substantially annular groove in each of the side walls around the first shaft, a frusto-conical groove in each of the side walls at the top thereof, said frusto-conical grooves communicating at the bottom thereof with the annular grooves, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, and means to rotate the first shaft and drive the belts to individually raise and lower the cards within the case.

3. A card filing device comprising a case, opposed side walls, a front and rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a plurality of transverse grooves in the face of each of the drive and driven wheels to receive the belt corrugations, a substantially annular groove in each of the side walls around the first shaft, a frusto-conical groove in each of the side walls at the top thereof, said frusto-conical grooves communicating at the bottom thereof with the annular grooves, a window in the front wall of the case adjacent the frusto-conical wall whereby cards adjacent thereto within the case may be read, a card removing opening in the case at the top thereof, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, and means to rotate the first shaft and drive the belts to individually raise and lower the cards within the case.

4. A card filing device comprising a case, opposed side walls, a front and rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a plurality of transverse grooves in the face of each of the drive and driven wheels to receive the belt corrugations, a substantially annular groove in each of the side walls around the first shaft, a frusto-conical groove in each of the side walls at the top thereof, said frusto-conical grooves communicating at the bottom thereof with the annular grooves, a window in the front wall of the case adjacent the frusto-conical wall whereby cards adjacent thereto within the case may be read, a card removing opening in the case at the top thereof, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, means carried by the case and overlying the card removing opening to engage and raise individual cards, and means to rotate the first shaft and drive the belts to individually raise and lower the cards within the case.

5. A card filing device comprising a case, opposed side walls, a front wall and a rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a substantially annular groove in each of the side walls around the first shaft, a frusto-conical groove in each of the side walls at the top thereof, said frusto-conical grooves communicating at the bottom thereof with the annular grooves, a window in the front wall of the case adjacent the frusto-conical wall whereby cards adjacent thereto within the case may be read, a card removing opening in the case at the top thereof, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, means comprising a bracket carried by the case and an arm on said bracket overlying the card removing opening to engage and raise individual cards, and means to rotate the first shaft and drive the belts to individually raise and lower the cards within the case.

6. A card filing device according to claim 5 in which the arm is provided with permanent magnets and the cards have a member formed of ferrous material at the top thereof for engagement by the said magnets.

7. A card filing device comprising a case, opposed side walls, a front and rear wall on said case, a first horizontal shaft in the case supported between the side walls, a drive wheel spaced from each end of the first shaft and secured thereto, a second horizontal shaft in the case above the first shaft, a driven wheel on the second shaft spaced from each end thereof, a continuous belt interconnecting each drive wheel and driven wheel, horizontal corrugations in the said belts, a plurality of transverse grooves in the face of each of the drive and driven wheels to receive the belt corrugations, a substantially annular groove in each of the side walls around the first shaft, a frusto-conical groove in each of the side walls at the top thereof, said frusto-conical grooves communicating at the bottom thereof with the annular grooves, a window in the front wall of the case adjacent the frusto-conical wall whereby cards adjacent thereto within the case may be read, a card removing opening in the case at the top thereof, opposed flaps within the case journaled at their lower ends upon the first shaft, spring means to urge the flaps toward each other, a plurality of cards carried within the case between the flaps, outwardly extending pins on said cards slidably received at their ends within the side wall grooves and belt corrugations, means comprising a bracket slidably carried by the case and an arm on said bracket overlying the card removing opening to engage and raise individual cards, and means to rotate the first shaft and drive the belts to individually raise and lower the cards within the case.

References Cited by the Examiner

UNITED STATES PATENTS

| | | | |
|---|---|---|---|
| 790,896 | 5/05 | Herbert | 40—78 |
| 1,355,664 | 10/20 | Grover | 40—78 |
| 1,389,592 | 9/21 | Mather | 40—78 |

FRANK B. SHERRY, *Primary Examiner.*

CHANCELLOR E. HARRIS, *Examiner.*